United States Patent Office 3,083,169
Patented Mar. 26, 1963

3,083,169
MANUFACTURING METHOD OF ELECTRICAL
CONDUCTIVE PLASTICS
Yoshitaka Ueda, 956 Takakura-cho-2-chome,
Miyakojima-ku, Osaka City, Japan
No Drawing. Filed Sept. 29, 1960, Ser. No. 59,172
Claims priority, application Japan Oct. 12, 1959
5 Claims. (Cl. 252—511)

For some years electrical conductive plastics have been watched and studied with keen interest and the field of their use has also been constantly expanding. However, conventional electrical conductive plastics are no more than the products made by mechanically mixing electrical conductive materials such as metal powder (mainly copper or silver) and carbon powder with electrical insulating plastics, and by molding them in various forms. Consequently, they can have electrical conductivity only when the electrical conductive metal powder and carbon powder come into contact with each other forming an electrical conductor. Their electrical conductivity is limited, however, by the fact that in order to render the mixture moldable a certain amount of electrically insulating plastic material must be intermixed.

Thus, the conventional manufacturing methods of electrical conductive plastics have such disadvantages that the smaller the proportion of plastic element to be mixed with metal powder and carbon powder, the more difficult does it become to mix the entire composition evenly, that the degree of electrical conductvity cannot always be the same in every part of the product, that the mechanical properties of the product cannot help being greatly reduced and that the cost of production becomes very high because of the necessity of making the particles of metal powder and carbon powder ultra-fine such as approximately $0.1\mu$.

Now, the present invention relates to a manufacturing method of electrically conductive plastics with excellent electrical conductivity and mechanical properties by means of making water-soluble phenolic resin with a certain amount of water (i.e. good electrical conductor), adding thereto one or several of such materials as copper powder, silver powder, other metal powder and carbon powder, mixing them, then curing them by heat and pressure. Accordingly, it is an object of the present invention to convert the plastic element of the product from electrical insulating character into electrical conductive character by using water-soluble phenolic resin containing a certain amount of water (i.e. good electrical conductor) instead of electrical insulating plastics which have hitherto been used as a binder.

The following is a comparison of the value of insulation resistance between pure phenolic resins and water-soluble phenolic resin,

| | Insulation resistance |
|---|---|
| Pure phenolic moldings | $2.5 \times 10^5$ M$\Omega$ |
| Water-soluble phenolic moldings (amount of contained water 21.6%) | $4.0 \times 10^{-2}$ M$\Omega$ |
| Water-soluble phenolic moldings (amount of contained water 40%) | $2.0 \times 10^{-4}$ M$\Omega$ |

As is seen in the above, when water-soluble phenolic resin is made to contain water (i.e. good conductor) to the extent not to lower its mechanical properties, it becomes possible to correlate the quantity there of to the proportion of metal powder and carbon powder without spoiling conductivity and to mix them fully, whereby the product has uniform electrical conductivity in every part and sufficient mechanical properties as well.

An example of application of the present invention is as follows. Electrical conductive plastic articles in optional forms were produced by providing equivalent quantities of phenol and formalin (37%) and, after adding a small amount of alkaline catalyst (NaOH), making them react at a temperature between 60° C. and 80° C. for two or three hours, depressing and dehydrating them at a temperature less than 80° C., thus producing water-soluble phenolic resin containing a certain amount of water, adding one or several of the following powders of copper powder, silver powder, other metal powder and carbon powder, mixing them by a mixer or a roller, pouring the mixture into a mold, then curing it by heat and pressure.

The physical efficiencies of the product thus obtained were:

| | |
|---|---|
| Tensile strength, p.s.i. | 7000~1000 |
| Compressive strength, p.s.i. | 12000~15000 |
| Specific gravity | 3.5~4.0 |
| Electric resistance | $0.0172\Omega \cdot mm.^2/m.$ |
| Volume resistivity | $1.69 \times 10^{-2} \Omega \cdot cm.$ |
| Hardness (Brinell hardness 2.5 m./m. ball 25 kg. weight) | 30°~45° |

Further, when the product was required to have flexibility, the problem could be solved by using polyvinyl alcoholic resin or some other resin of the same family. That is to say, the product which had the same electric effiiency as abovementioned and considerable flexibility as well was obtained by using a specific resin produced either by mixing polyvinyl alcohol in an amount of 10~50% (proportionally to phenol) with phenol, formalin and a catalyst and making them react at the very beginning of the process of forming the water-soluble phenolic resin or by adding polyvinyl alcohol in an amount of 10~50% to water-soluble phenolic resin in the form of initial condensation product.

Although the electrical conductive plastics with these physical qualities cannot compete with copper, silver and other metals in tensile strength and compressive strength, it has been proved by experiments that these products are superior to general purpose phenolic resins and other plastics and moreover they have a greatly improved electrical conductivity as compared with conventional electrical conductive plastics. It can be said, therefore, that they are epoch-making products which can take the place of copper, silver and other metals being used today as the conductive material of electric articles and which are higher in rust-proof quality and lower in price and specific gravity comparing with copper, silver and other metals.

Summarizing the foregoing explanation, the conventional electrical conductive plastics depend for their electrical conductive efficiency entirely on the conductive material (copper powder, carbon powder, etc.) such electrical conductivity being limited to some extent by the electrical insulating plastic element which is essential to the formation of the article, whereby there arises a limit to the improvement of their electrical conductive efficiency. On the other hand, the conductive plastics produced by the method of the present invention are characterized by the use of water-soluble phenolic resin which has the effect of converting electrical insulating plastic into electrical conductive one, and accordingly, their electrical conductivity has been greatly improved.

I claim as my invention:

1. In a method for manufacturing an electrically conductive plastic, by incorporating in a synthetic resin material as powder selected from the group consisting of copper powder, silver powder and carbon powder in sufficient amount for imparting electrical conductivity to said material and curing the resulting mixture, the improvement consisting of incorporating said powder in a water-soluble phenolic resin having a water content of from about 21.6 to 40%.

2. The process described in claim 1, wherein said water-soluble phenolic resin is obtained by reacting equivalent amounts of phenol, 37%-formalin and a catalytically effective amount of sodium hydroxide in the presence of water at a temperature between 60° and 80° C. for two or three hours under pressure and then dehydrating and depressing the resulting product below 80° C. until the water content of the product is between 21.6 and 40%, whereupon said powder is mechanically admixed thereto.

3. The process described in claim 1, wherein from about 10 to about 50% calculated on the amount of the phenol component present in said water-soluble phenolic resin, consists of polyvinyl alcohol.

4. The process described in claim 2, wherein from about 10 to 50% per weight of phenol are replaced by polyvinyl alcohol.

5. The process described in claim 2, wherein said powder is admixed to said product in such amounts that the specific gravity of the resulting plastic is about 3.5 to 4.0.

References Cited in the file of this patent

UNITED STATES PATENTS

| | | |
|---|---|---|
| 2,120,549 | Dike | June 14, 1938 |
| 2,472,801 | Barfield et al. | June 14, 1949 |
| 2,864,774 | Robinson | Dec. 16, 1958 |
| 2,890,948 | Fantl | June 16, 1959 |
| 2,967,789 | Hoyt | Jan. 10, 1961 |